United States Patent [19]
Aepli et al.

[11] Patent Number: 5,790,762
[45] Date of Patent: Aug. 4, 1998

[54] OPTICAL WAVEGUIDE PLUG ADHESIVE CONSISTING OF AT LEAST COMPONENTS AND METHOD OF USING SAME

[75] Inventors: Etienne Aepli, Speicherschwendi; Kurt Stephan, Herisau, both of Switzerland

[73] Assignee: Huber & Suhner AG, Herisau, Switzerland

[21] Appl. No.: 922,183

[22] Filed: Sep. 2, 1997

Related U.S. Application Data

[62] Division of Ser. No. 512,924, Aug. 9, 1995, abandoned.

[30] Foreign Application Priority Data

Aug. 12, 1994 [CH] Switzerland ............... 02497/94

[51] Int. Cl.$^6$ ........................................... G02B 6/38
[52] U.S. Cl. ............... 385/80; 385/60; 385/76; 385/77; 385/78; 385/139; 385/141
[58] Field of Search ................ 385/51, 60, 65, 385/71, 72, 76, 77, 80, 82, 83, 139, 141; 156/158, 160

[56] References Cited

U.S. PATENT DOCUMENTS

| | | | |
|---|---|---|---|
| 4,330,171 | 5/1982 | Malsot et al. | 385/80 X |
| 4,722,584 | 2/1988 | Kakii et al. | 385/80 X |
| 4,770,487 | 9/1988 | Williams | 385/60 X |
| 5,241,613 | 8/1993 | Li et al. | 385/78 |
| 5,420,952 | 5/1995 | Katsura et al. | 385/80 |
| 5,422,971 | 6/1995 | Honjo et al. | 385/80 |
| 5,621,835 | 4/1997 | Takahashi et al. | 385/78 |
| 5,621,836 | 4/1997 | Schofield et al. | 385/80 |
| 5,673,347 | 9/1997 | Pitassi | 385/70 |
| 5,699,466 | 12/1997 | Uchida et al. | 385/80 |

*Primary Examiner*—Brian Healy
*Attorney, Agent, or Firm*—Jay H. Maioli

[57] ABSTRACT

An adhesive is to be provided of which one component can be stored virtually with exclusion of air, in anaerobicform, for a prolonged period, and can thus be introduced into the sleeve of an optical connector in a production operation, and the second component of which can be introduced into the first component with the fiber at the assembly site. This is achieved by an adhesive consisting of at least two components, in which the reaction is initiated by interface contact of the two components. For this purpose the two components each comprise unsaturated compounds which are dissolved in mono- and/or polyfunctional acrylates. One component of the adhesive comprises an organometallic compound and the other component an unsaturated dicarboxylic acid and peroxide. The two components are stable on storage and can be stored for a prolonged period without crosslinking, so that one component can be inserted into a ferrule for an optical plug connection and, as required, the optical waveguide, which can be wetted with the second component, brings about polymerization within minutes by interface reaction when inserted into the ferrule.

13 Claims, 1 Drawing Sheet

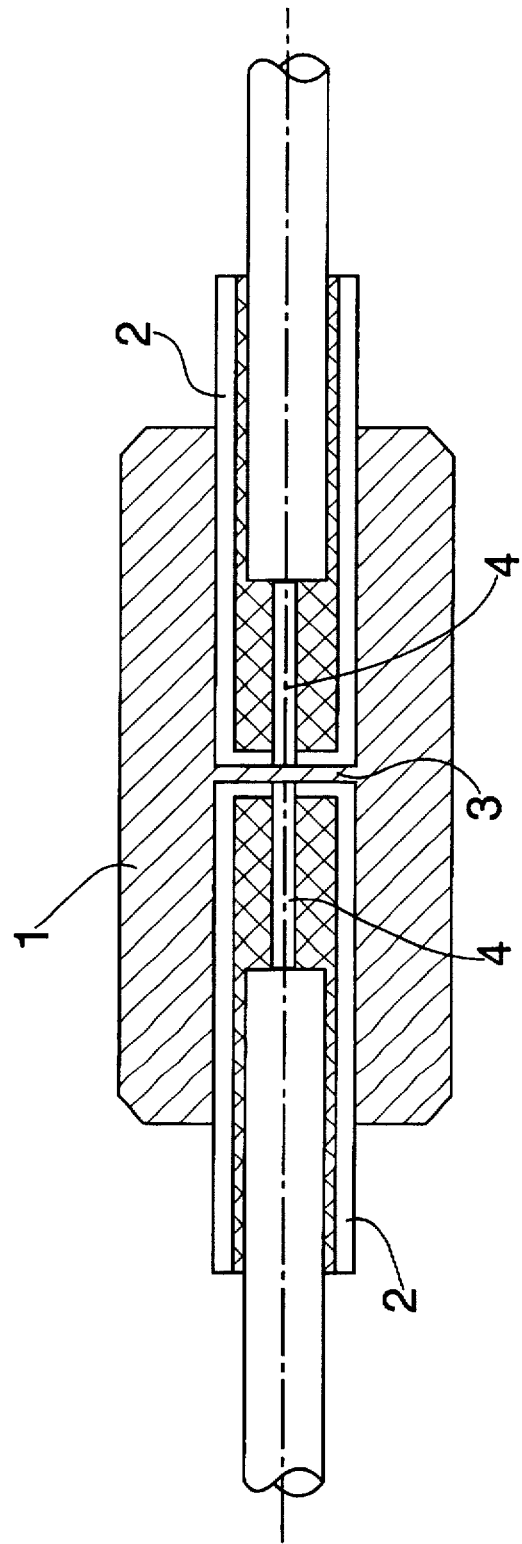

OPTICAL WAVEGUIDE PLUG ADHESIVE CONSISTING OF AT LEAST COMPONENTS AND METHOD OF USING SAME

This is a division of application Ser. No. 08/512,924 filed Aug. 9, 1995, now abandoned.

The present invention relates to an adhesive consisting of at least two components, in which the reaction is initiated by interface contact of the two components.

As is known, in starting monomers suitable for polymerization adhesives, the presence of one or more carbon—carbon double bonds in the molecule, whose energy content is greater than that of the single bond, is important. Polymerization occurs by the breaking of this double bond as a consequence of the transition from a high-energy to a lower-energy state.

In this way, for all molecules containing the double bond, a concatenation of many molecules can be obtained, forming a polymer. Breaking the double bond requires activation of the bond energy in the monomer molecule. This activation can be brought about either by appropriate catalysts or free radicals, which induce anionic, cationic or free-radical polymerization, or by radiation, such as UV radiation or an electron beam.

In one-pack polymerization adhesives, the monomers are stabilized such that polymerization begins only under the influence of factors which become effective during or after application to the parts to be joined. Such influencing factors are obtained by methods including the addition of metal ions with simultaneous exclusion of oxygen, for example with so-called anaerobic adhesives.

The distinctive feature of such one-pack polymerization adhesive systems is a curing mechanism which operates in the absence of oxygen. Such adhesives remain in a liquid state for as long as they are in contact with atmospheric oxygen. Following the exclusion of oxygen as the parts to be bonded are brought together, polymerization commences in a very short time under the simultaneous influence of metal ions.

The curing time is dependent on the catalytic activity of the respective metal surface and on the temperature; room temperature-curing systems require from 5 to 10 h to attain their functional reliability.

In two-pack polymerization adhesives, too, the C=C double bond is activated by free radicals. These free radicals may be formed on the one hand by photoinitiators or by the direct action of radiation and, on the other hand, from radical-forming substances which are added to the monomer as so-called hardeners. For application, the parts to be connected are coated with the adhesive system, consisting of two components mixed with one another, and are joined.

One radical-forming substance used is dibenzoyl peroxide which, as added hardener component, is cleaved by an accelerator into two free radicals. Accelerators which can be used include tertiary aromatic amines.

An important application of such adhesives is the butt or end-face coupling of optical waveguides. For this purpose the fibers are centered in very precise bores and are adhesively bonded. Where this takes place as a manufacturing process in a manufacturing plant, the effort to be expended plays a smaller role than if such a coupling is to be produced in the field. The term "in the field" here stands for all conceivable applications outside a manufacturing plant.

Among experts, a great number of methods are known for how the fiber inserted into the sleeve must be machined for optical transmission and for good centering. One example is shown in EP-B-0 464 161. In a proposed solution disclosed by 3M, the sleeve is to be filled with a hot-melt (thermoplastic) and, after heating, the fiber can be inserted.

An alternative solution to the problem is proposed by AT & T. In a bottle, the fiber is to be treated with a primer, and then adhesive is to be introduced into the sleeve using a syringe in such an amount as to fill completely the bore of the sleeve. Subsequently, the pretreated fiber can be thrust into the sleeve. The curing time given is one minute. However, to deal with two components in such a precise technical operation is not something which can be accomplished by just anyone.

Accordingly, it is an object of the invention to provide an adhesive of which one component can be stored virtually with exclusion of air, in anaerobic form, for a prolonged period, and can thus be introduced into the sleeve of an optical connector in a production operation, and the second component of which can be introduced into the first component with the fiber at the assembly site.

In accordance with the invention, this is achieved by the features given in the defining part of claim 1 by each of the two components comprising unsaturated compounds dissolved in mono- and/or polyfunctional acrylates.

An application example is shown in the drawing. The single FIGURE shows an optical plug connection operating on the sleeve principle.

In a precision guide sleeve 1, a ferrule 2 with polished end face 3 is inserted at each side until the two polished end faces 3 meet. An optical waveguide 4 is adhesively bonded into each of the ferrules 2. The most popular method for bringing about optimum positioning of optical waveguides in a plug consists in the precise centering of the glass fiber in a high-precision bore with adhesive bonding. For this purpose, the optical waveguides are freed from their primary and secondary coating and bonded with an adhesive into the ferrule, of which the sleeve base has a central bore which corresponds, with a tolerance of up to a few micrometers on the plus side, to the diameter of the glass fiber. This sleeve bottom is then, together with the fiber which protrudes by a few millimeters, ground and polished to optical accuracy down to the sleeve bottom.

Thus it is understandable that the adhesive also has to meet quite specific conditions; for instance, one component of an adhesive of two-pack configuration should be able to be stored for a prolonged period under airtight conditions, since in this way the ferrule can be prefilled with this component so that the second component can be introduced into the ferrule with the glass fiber so as to initiate immediate polymerization therein.

It is known that there is a danger with acrylate/methacrylate adhesives that they will cure under airtight conditions as a one-pack adhesive. For this reason it has also been proposed to seal the open rear face of the ferrule with a relatively large cap, which contains sufficient oxygen at least to delay this reaction. Naturally, such a solution is not easy to employ.

Various acrylates/methacrylates have been investigated for the preparation of an anaerobically stable adhesive. It has been found that there are acrylates or methacrylates which crosslinked in a very short time under a vacuum of 0.8–0.9 bar and at 40° C., but that there are also special forms which remain uncrosslinked for more than 24 hours. Experiments were carried out, then, with these substances, examples of which are 1) lauryl methacrylate and
2) ditrimethylolpropane tetraacrylate.

It must be assumed that the inertness of these substances is based on the fact that the otherwise unstable double bond in the carbon compound is in these cases stabilized by the particular steric configuration.

The external conditions for these adhesives arise from the fact that they adhere to glass, metal, especially nickel, plastics and ceramics. From this there results the following formulation for such adhesives, which can be stored anaerobically:

| first component: | |
|---|---|
| A) unsaturated polyester resin, styrene-free, based on tricyclodecanediol (brings about adhesion and high viscosity) | 35% |
| B) unsaturated polyester resin, styrene-free, based on terephthalic/phthalic/fumaric acid (brings about adhesion and high viscosity) | 15% |
| C) monofunctional cycloaliphatic acrylate (crosslinking solvent for the substances under A) and B)) | 30% |
| D) polyfunctional ethoxylated aliphatic acrylate (solvent for substances A) and B), quick-reacting) | 16.5% |
| E) organometallic compound (accelerator) | 3% |
| F) stabilizer (for stabilizing substances C) and D)) | 0.5% |
| second component | |
| G) unsaturated polyester resin, styrene-free, based on tricyclodecanediol (brings about adhesion and high viscosity) | 35% |
| H) unsaturated polyester resin, styrene-free, based on terephthalic/phthalic/fumaric acid (brings about adhesion and high viscosity) | 15% |
| I) monofunctional cycloaliphatic acrylate (crosslinking solvent for the substances under A) and B)) | 30% |
| K) polyfunctional ethoxylated aliphatic acrylate (solvent for substances A) and B), quick-reacting) | 15% |
| L) unsaturated or saturated mono- or dicarboxylic acids, anhydrides thereof*) | 2% |
| M) peroxide (initiator) | 2.5% |
| N) stabilizer (for stabilizing substances I) and K)) | 0.5% |

*)The mono-, di- or polyfunctional carboxylic acids must be capable of rearranging the organometallic compounds.

Introduced into the ferrule, this first adhesive component retains its integrity for a prolonged period. Thus, it has been possible to demonstrate that such a first component could be reacted after one month at −0.8 bar and 50° C. This first component was liquid prior to the reaction and showed no signs of gelation.

For the start of the reaction it was envisaged to wet the glass fiber with the second component and to thrust it into the ferrule filled with the first adhesive component. For such a system to be capable of use in practice, the polymerization must take place within a useful period, i.e. within minutes.

The viscosities provided for both substances were between 1000 mPas and 100,000 mPas. As regards the reaction time, the start at 30 sec and the end at 5 min were found, i.e. a very useful reaction time for the intended application.

For polymerization to the desired extent, i.e. with a possible initiation by interface contact, the above-mentioned components L) and M) are used in conjunction with component E) of the first adhesive component.

Experiments in the laboratory have shown that the peroxide in the ferrocene component alone is not activated.

Likewise, the peroxide is not activated in the presence of maleic acid from component L). In contrast, it has been found that the meeting of maleic acid and ferrocene in the presence of peroxides leads to a spontaneous reaction. In this context it is self-evident that the effect of heat may alter the reaction time.

Suitable acrylates are mono-, di-, tri- and higher polyfunctional acrylic and methacrylic compounds, such as alkyl/aryl acrylates and methacrylates, hydroxy esters, amino-amide compounds, ether monoesters, glycol derivatives, diol compounds from butane to dodecane, glycidyl esters, including bisphenol A and F derivatives, etc., oligomers such as PU/EP/UP/polyester, melamine, etc., which have reaction-accelerating or adhesion-promoting properties.

Suitable polyester components are unsaturated polyester resins from the group consisting of unsaturated polybasic carboxylic acids such as fumaric acid, maleic acid, itaconic acid, citraconic acid, mesaconic acid and anhydrides thereof, and combinations of unsaturated or saturated polybasic carboxylic acids, reacted with polyhydric alcohols, such as ethylene, propylene and neopentyl glycol, 1,4-cyclohexanediolmethanol, 1,4-butanediol, bisphenol A and F. The vinyl ester resins are also counted among this group. Adhesion is achieved, for example, by way of free carboxyl groups, and hardness and temperature resistance by way of bisphenol A and/or F compounds.

The peroxides which are suitable are tertiary butyl perbenzoate, 2,2-bis(tert-butylperoxy)butane, 1,1-bis(tert-butylperoxy)benzene, bis(tert-butylperoxyisopropyl)benzene or tert-butyl permaleate. It is just as possible, however, to use other peroxides which react in a temperature range between +60° and +200° C.

I claim:

1. An optical plug connection with an optical waveguide bonded adhesively into a ferrule by means of an adhesive comprising:
    a precision sleeve;
    a first optical waveguide arranged within a first ferrule at one end;
    a first anaerobic adhesive component placed around the ferrule at the first end of the first optical waveguide;
    a second optical waveguide arranged with a second ferrule at one end;
    a second adhesive component including a peroxide derivate, wherein said second adhesive component is placed on said second ferrule and said first and second ferrules are arranged in said precision sleeve in contact while said first and second components cure.

2. The optical plug as claimed in claim 1, where each of the adhesive components comprise unsaturated compounds dissolved in mono- and/or polyfunctional acrylates.

3. The optical plug connection as claimed in claim 2, wherein the unsaturated compounds are resins.

4. The optical plug connection as claimed in claim 3, wherein the unsaturated compounds are polyester resins.

5. The optical plug connection as claimed in claim 4, wherein the unsaturated polyester resins are unsaturated polybasic carboxylic acids and combinations of unsaturated or saturated polybasic carboxylic acids reacted with polyhydric alcohols.

6. The optical plug connection as claimed in claim 5, wherein the unsaturated polybasic carboxylic acid is maleic acid or acrylic/methacrylic acid.

7. The optical plug connection as claimed in claim 1, wherein one adhesive component is an organometallic compound.

8. The optical plug connection as claimed in claim 7, wherein the organometallic compound is ferrocene or vanadium III acetylacetonat.

9. The optical plug connection as claimed in claim 2, wherein the acrylates are selected from the group consisting of monoacrylic compounds, diacrylic compounds, triacrylic compounds, polyfunctional acrylic compounds and methacrylic compounds.

10. The optical plug connection as claimed in claim 9, wherein the methacrylic compounds are lauryl methacrylate and ditrimethylolpropane tetraacrylate.

11. A method of preparing an optical plug connection comprising steps of:

preparing a first adhesive component that can be stored in anaerobic form for a prolonged period of time;

introducing the first adhesive component into a sleeve of an optical connector;

preparing a second adhesive component that can be cured upon contact with the first adhesive component;

contacting the second adhesive component with an optical fiber;

inserting the optical fiber contacted with the second component into the sleeve;

maintaining the optical fiber in the sleeve until the first and second adhesive components have cured.

12. The method of preparing an optical plug connection as claimed in claim 11, wherein each of the adhesive components comprise unsaturated compounds dissolved in mono- and/or polyfunctional acrylates and which adhesive components remain anaerobically stable.

13. The method of preparing an optical plug connection as claimed in claim 11, wherein the adhesive composition is formed within 30 seconds to 5 minutes after contact of the adhesive components.

* * * * *